United States Patent
Yu (10) Patent No.: US 9,106,085 B2
(45) Date of Patent: Aug. 11, 2015

(54) COMBINED TRANSFORMER, AND NON-CONTACT BATTERY CHARGING DEVICE USING THE SAME

(71) Applicant: UC-Logic Technology Corp., New Taipei (TW)

(72) Inventor: Joe Yu, New Taipei (TW)

(73) Assignee: UC-LOGIC TECHNOLOGY CORP., New Taipei (TW)

( * ) Notice: Subject to any disclaimer, the term of this patent is extended or adjusted under 35 U.S.C. 154(b) by 355 days.

(21) Appl. No.: 13/784,058

(22) Filed: Mar. 4, 2013

(65) Prior Publication Data

US 2014/0247006 A1    Sep. 4, 2014

(51) Int. Cl.
*H02J 7/00* (2006.01)
*G06F 3/0354* (2013.01)
*H02J 7/02* (2006.01)
*H01F 38/14* (2006.01)
*G06F 3/033* (2013.01)

(52) U.S. Cl.
CPC .............. *H02J 7/0044* (2013.01); *G06F 3/033* (2013.01); *G06F 3/03545* (2013.01); *H01F 38/14* (2013.01); *H02J 7/025* (2013.01)

(58) Field of Classification Search
CPC ....... H02J 7/0044; H02J 7/0042; H02J 7/025; H01F 38/14; G06F 3/033; G06F 3/0354

USPC .......................................................... 320/108
See application file for complete search history.

(56) References Cited

U.S. PATENT DOCUMENTS

| 4,510,476 | A | * | 4/1985 | Clatterbuck et al. | ........ 336/84 C |
|---|---|---|---|---|---|
| 4,740,731 | A | * | 4/1988 | Crawford | ...................... 315/141 |
| 8,305,036 | B2 | * | 11/2012 | Toya et al. | ..................... 320/108 |
| 2009/0267559 | A1 | * | 10/2009 | Toya et al. | ..................... 320/108 |
| 2009/0267560 | A1 | * | 10/2009 | Toya et al. | ..................... 320/108 |
| 2010/0277327 | A1 | * | 11/2010 | Lee | ........................... 340/636.16 |
| 2013/0193915 | A1 | * | 8/2013 | Jung et al. | ...................... 320/108 |
| 2014/0155685 | A1 | * | 6/2014 | Leigh et al. | ...................... 600/25 |

* cited by examiner

*Primary Examiner* — M'Baye Diao
(74) *Attorney, Agent, or Firm* — Duane Morris LLP (57) ABSTRACT

A non-contact battery charging device is for charging a touch pen using a combined transformer. The combined transformer includes a primary winding wound around a tubular insulating spool secured in a receptacle of a pen stand and allowing insertion of the touch pen, and a second primary wound around a magnetic core coaxially secured in the touch pen. A section of the magnetic core is coaxially located in the spool when the touch pen is inserted into the receptacle and extends through the spool. A charger having the magnetic core and the secondary winding is operable to supply a charging voltage to a rechargeable battery in the touch pen based on an input voltage across the primary winding.

11 Claims, 6 Drawing Sheets

COMBINED TRANSFORMER, AND NON-CONTACT BATTERY CHARGING DEVICE USING THE SAME

BACKGROUND OF THE INVENTION

1. Field of the Invention

The invention relates to a transformer, and more particularly to a combined transformer and a non-contact battery charging device using the same.

2. Description of the Related Art

A non-rechargeable battery, which usually installed in a touch pen for supplying electric power, is designed to be used once and discarded. Thus, frequent replacement of a batter is required for such touch pens, thereby resulting inconvenience during use. Further, the frequent requirement of battery replacement causes extra costs and environmental problems.

A conventional battery charger for charging a touch pen usually utilizes a plug connector inserted into a jack connector provided in the touch pen establish electrical connection therebetween during charging. Each of the plug connector and the jack connector has a plurality of exposed electrical contacts that are easily oxidized. The plug connector may be deformed due to accidental collision, and deformation of the plug connector may cause poor electrical connection between the plug connector and the jack connector.

SUMMARY OF THE INVENTION

Therefore, an object of the present invention is to provide a non-contact battery charging device using a combined transformer that can overcome the aforesaid drawbacks of the prior art.

According to one aspect of the present invention, there is provided a combined transformer for use in a battery charging device for charging a touch pen. The combined transformer of this invention comprises a tubular insulating spool, a primary winding, an elongate magnetic core, and a secondary winding.

The tubular insulating spool allows extension of the touch pen therethrough.

The primary winding is wound directly onto the tubular insulating spool.

The magnetic core is used to be coaxially secured in the touch pen. A section of the magnetic core is coaxially located in the tubular insulating spool when the touch pen is inserted into the tubular insulating spool to be charged such that the primary winding coaxially surrounds the section of the magnetic core.

The secondary winding is to be disposed in the touch pen, and is wound directly onto the magnetic core. The secondary winding is coaxial with the primary winding when the touch pen extends through the tubular insulating spool such that the secondary winding cooperates with the primary winding and the magnetic core to serve as a transformer.

According to another aspect of the present invention, there is provided a non-contact battery charging device for charging a touch pen. The non-contact battery charging device of this invention comprises a pen stand, a combined transformer, a frequency signal generator, and a charger.

The pen stand has a receptacle for receiving the touch pen. The receptacle has an opening allowing insertion of the touch pen into the receptacle therethrough.

The combined transformer includes a tubular insulating spool, a primary winding, an elongate magnetic core, and a secondary winding. The tubular insulating spool is secured in the receptacle of the pen stand, and allows extension of the touch pen therethrough. The primary winding is wound directly onto the tubular insulating spool. The magnetic core is used to be coaxially secured in the touch pen. A section of the magnetic core is coaxially located in the tubular insulating spool when the touch pen is inserted into the receptacle of the pen stand through the opening and extends through the tubular insulating spool to be charged such that the primary winding coaxially surrounds the section of the magnetic core. The secondary winding is used to be disposed in the touch pen, and is wound directly onto the magnetic core. The secondary winding is coaxial with the primary winding when the touch pen extends through the tubular insulating spool such that the secondary winding cooperates with the primary winding and the magnetic core to serve as a transformer.

The frequency signal generator is disposed in the pen stand for generating a high frequency voltage signal and applying the high frequency voltage signal to the primary winding of the combined transformer.

The charger is used to be disposed in the touch pen, and has an assembly of the magnetic core and the secondary winding of the combined transformer. The charger is operable to supply a charging voltage to a rechargeable battery in the touch pen based on an input voltage across the primary winding of the combined transformer.

When the touch pen is inserted into the receptacle of the pen stand to be charged, the charger converts an output voltage, which is induced across the secondary winding of the combined transformer by making use of electromagnetic induction under high frequency oscillation, to the charging voltage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 1 to 4, the first preferred embodiment of a non-contact battery charging device for charging a touch pen 40 according to the present invention is shown to include a pen stand 11, a combined transformer (T), a frequency signal generator 12, and a charger 20. The touch pen 40 includes a pen barrel 41, and a rechargeable battery 42 installed in the pen barrel 41. In this embodiment, the pen barrel 41 has a writing end 411, and a tapered insertion end 412 opposite to the writing end 411.

The pen stand 11 has a receptacle 112 for receiving the touch pen 40. In this embodiment, the receptacle 112 has an upper opening 111 that only allows insertion of the insertion end 412 of the pen barrel 41 of the touch pen 40 into the receptacle 112 therethrough (see FIG. 3). As such, the touch pen 40 is positioned by the upper opening 111, and is supported by the pen stand 11 (see FIG. 4).

Figure 3:
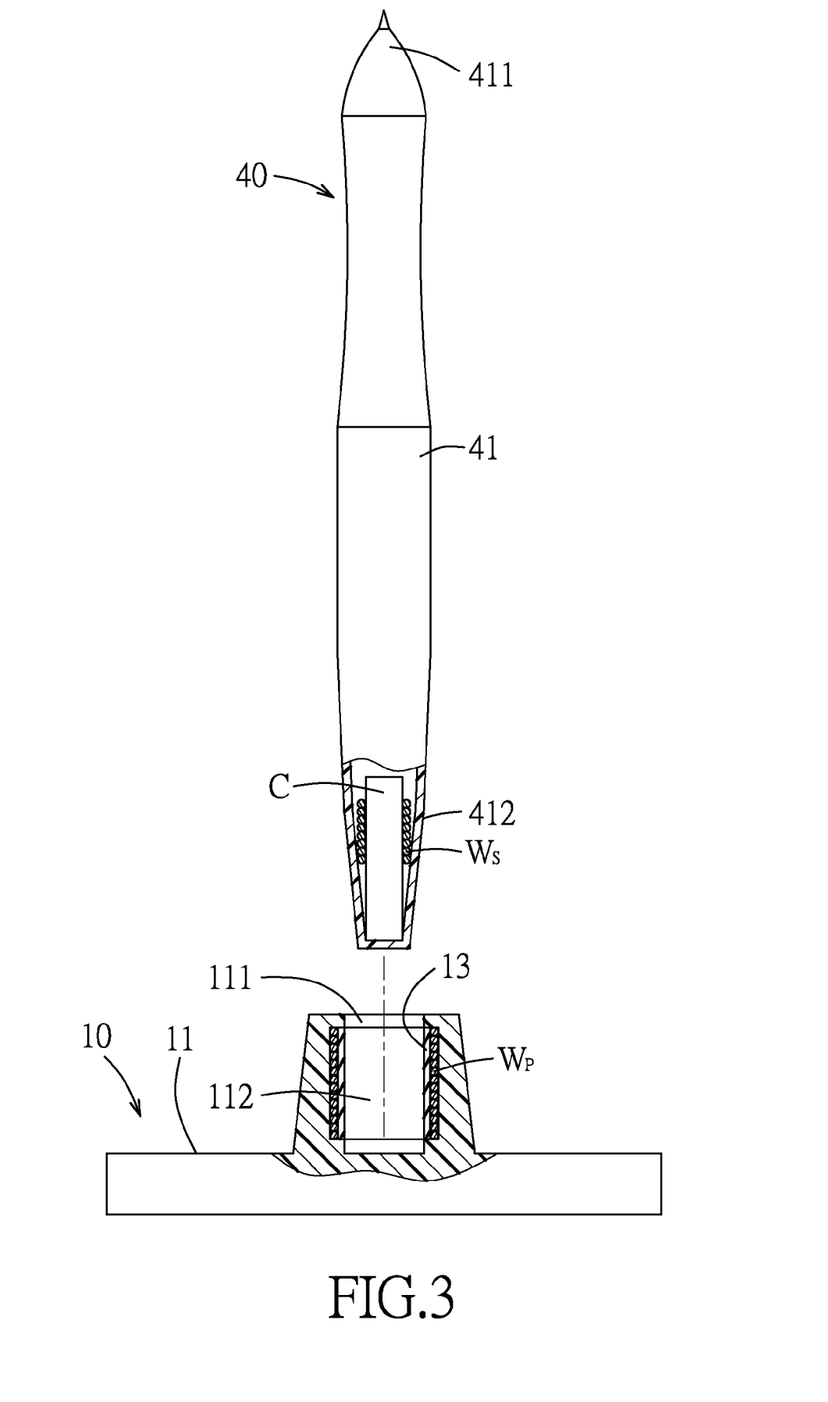
FIG. 3 is a partly sectional view illustrating a combined transformer of the first preferred embodiment in a non-combined state.
Figure 4:
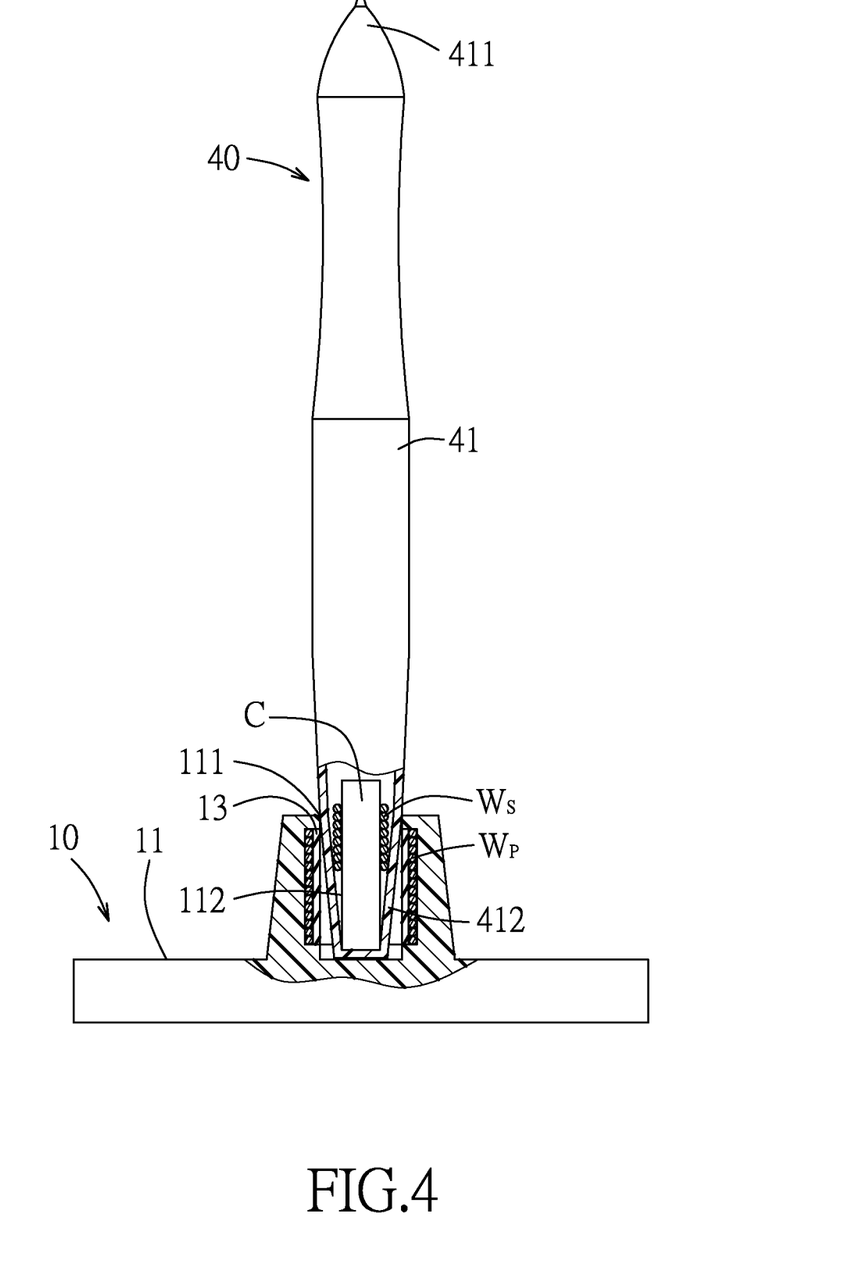
FIG. 4 is a partly sectional view illustrating the combined transformer of the first preferred embodiment in a combined state.

The combined transformer (T) includes a tubular insulating spool 13, a primary winding ($W_p$), an elongate magnetic core (C), and a secondary winding ($W_s$).

The insulating spool 13 is made of plastic, and is secured in the receptacle 112 of the pen stand 11. The insulating spool 13 allows extension of the insertion end 412 of the pen barrel 41 of the touch pen 40 therethrough.

The primary winding ($W_p$) is wound directly onto the insulating spool 13.

The magnetic core (C) is used to be coaxially secured in the pen barrel 41 of the touch pen 40. When the insertion end 412 of the pen barrel 41 of the touch pen 40 is inserted into the receptacle 112 of the pen stand 11 through the upper opening 111 and extends through the insulating spool 13 to be charged, a section of the magnetic core (C) is coaxially located in the insulating spool 13 such that the primary winding ($W_p$) coaxially surrounds the section of the magnetic core (c). In this embodiment, in order to achieve maximum magnetic excitation effect, the whole magnetic core (C) is coaxially disposed in the insertion end 412 of the pen barrel 41 of the touch pen (see FIG. 3), and the primary winding ($W_p$) coaxially surrounds a major part of the magnetic core (C) when the touch pen 40 is inserted into the pen stand 11 to be charged (see FIG. 4).

The secondary winding ($W_s$) is used to be disposed in the pen barrel 41 of the touch pen 40, and is wound directly onto the magnetic core (C). The secondary winding ($W_s$) is coaxial with the primary winding ($W_p$) when the insertion end 412 of the pen barrel 41 of the touch pen 40 extends through the insulating spool 13 such that the secondary winding ($W_s$) cooperates with the primary winding ($W_p$) and the magnetic core (C) to serve as a transformer.

When the touch pen 40 is separate from the pen stand 11, the combined transformer (T) is in a non-combined state.

When the touch pen 40 is inserted into the pen stand 11 to be charged, the combined transformer (T) is in a combined state. When the combined transformer (T) is in the combined state, the combined transformer (T) can transfer energy by inductive coupling between the primary and secondary windings ($W_p$, $W_s$). A varying current in the primary winding ($W_p$) creates a varying magnetic flux in the magnetic core (C) and thus a varying magnetic flux through the secondary winding ($W_s$). This varying magnetic flux induces a varying electromotive force (EMF) in the secondary winding ($W_s$) or an output voltage ($V_s$) across the secondary winding ($W_s$). This effect is called inductive coupling. The output voltage ($V_s$) induced across the secondary winding ($W_s$) can be obtained from Faraday's law of induction, which states that:

$$V_s = N_s \frac{d\Phi}{dt}, \qquad (1)$$

where $V_s$ is the instantaneous output voltage, $N_s$ is a number of turns in the secondary winding ($W_s$), and $\Phi$ is the magnetic flux through one turn of the secondary winding ($W_s$). If the turns of the coil are oriented perpendicularly to the magnetic field lines, the flux is the product of a magnetic flux density and an area through which it cuts. The area is constant, being equal to the cross-sectional area of the magnetic core (C), whereas the magnetic field varies with time according to the excitation of the primary winding ($W_p$). Ideally, the same magnetic flux passes through both the primary and secondary windings ($W_p$, $W_s$). Therefore, an instantaneous input voltage ($V_p$) across the primary winding ($W_p$) can be expressed by the following equation (2):

$$V_p = N_p \frac{d\Phi}{dt}. \qquad (2)$$

Taking the ratio of the equations (1) and (2) for $V_s$ and $V_p$ gives the following equation (3):

$$\frac{V_s}{V_p} = \frac{N_s}{N_p}. \qquad (3)$$

Figure 1:
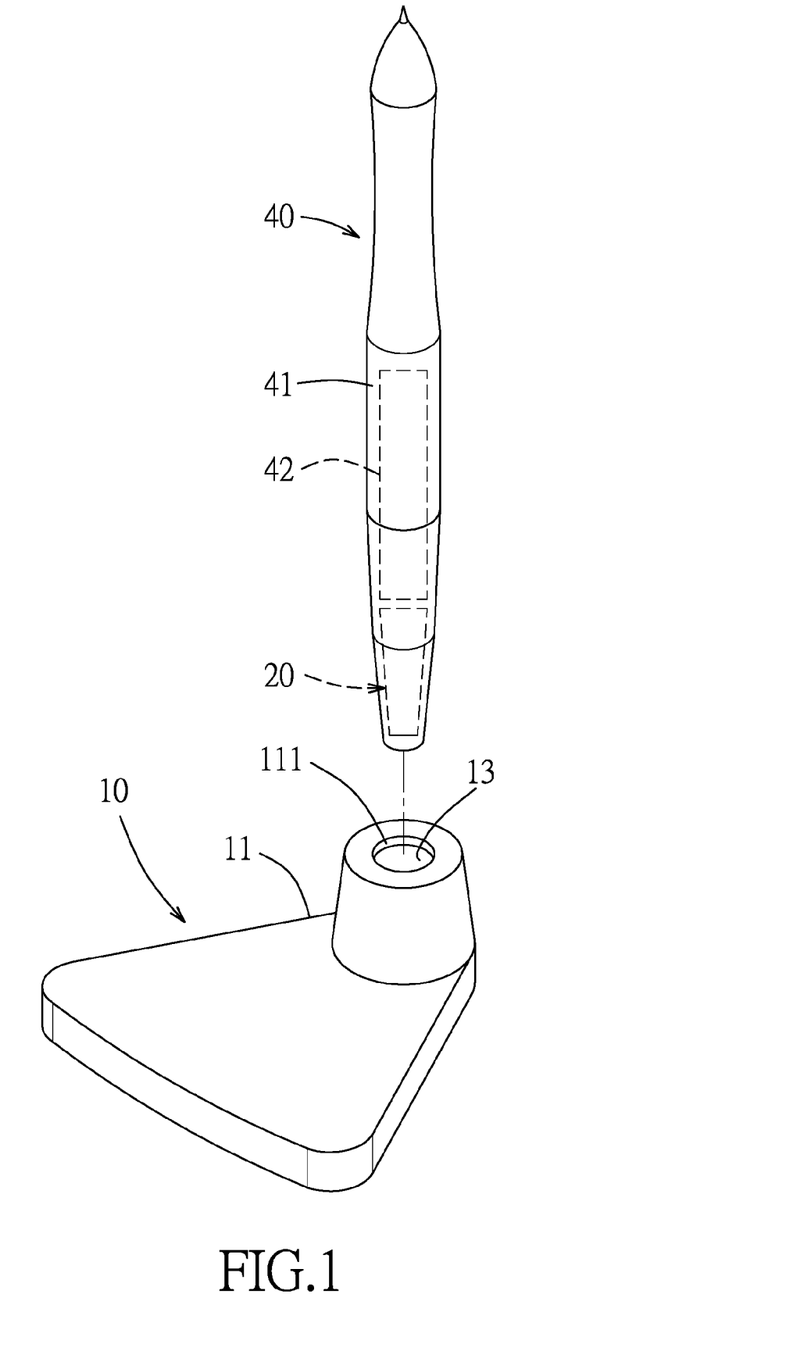
FIG. 1 is a perspective view showing a first preferred embodiment of a non-contact battery charging device for charging a touch pen according to the present invention.
Figure 2:
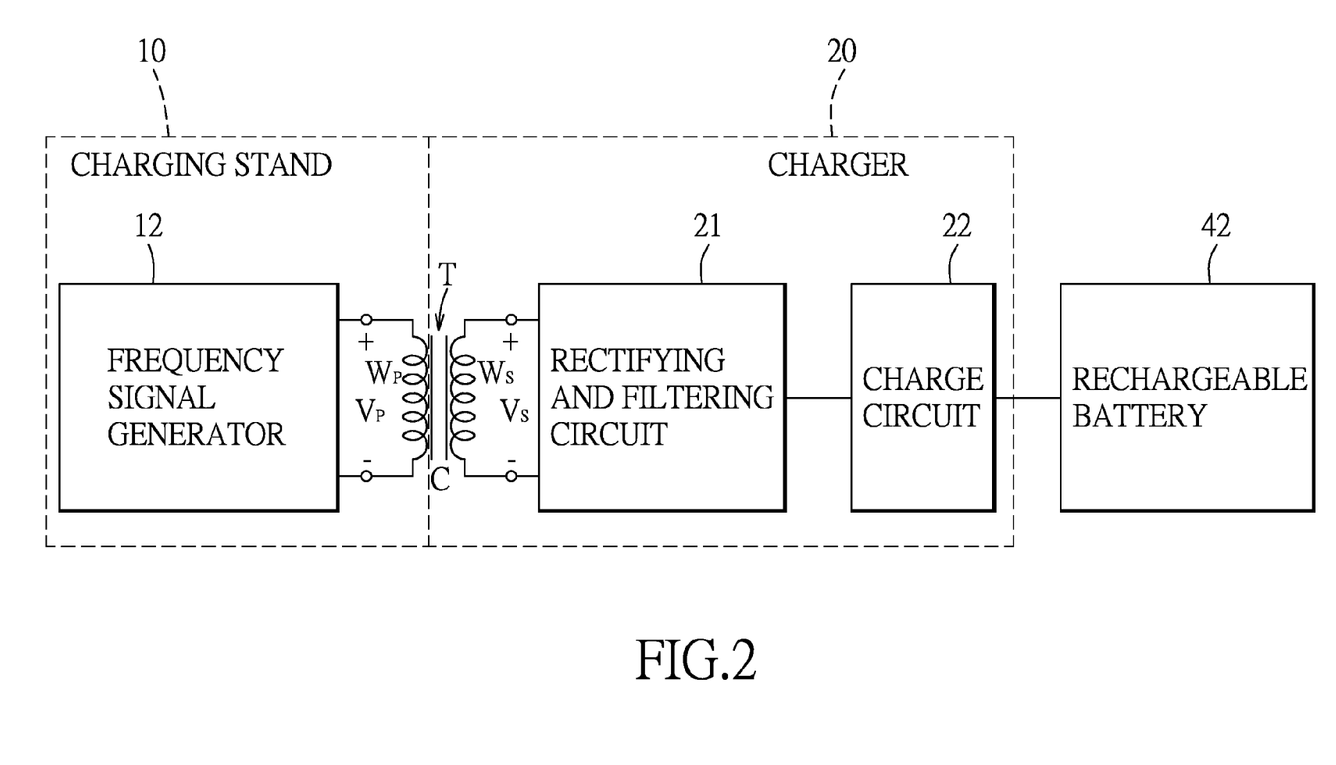
FIG. 2 is a schematic circuit block diagram illustrating the first preferred embodiment.

The frequency signal generator 12 is disposed in the pen stand 11 for generating a high frequency voltage signal, which is one of a sine wave signal and a square wave signal. The frequency signal generator 12 is coupled to the primary winding ($W_p$) for applying the high frequency voltage signal thereto.

It is noted that the pen stand 11 cooperates with an assembly of the insulating spool 13 and the primary winding ($W_p$), and the frequency signal generator 12 to constitute a charging stand 10.

The charger 20 is used to be disposed in the pen barrel 41 of the touch pen 40, and has an assembly of the magnetic core (C) and the secondary winding ($W_s$) of the combined transformer (T). The charger 20 is operable to supply a charging voltage to the rechargeable battery 42 of the touch pen 40 based on the input voltage ($V_p$) across the primary winding ($W_p$) of the combined transformer (T). When the touch pen 40 is inserted into the receptacle 112 of the pen stand 11 to be charged, the charger 20 converts the output voltage ($V_s$), which is induced across the secondary winding ($W_s$) by making use of electromagnetic induction under high frequency oscillation, to the charging voltage. In this embodiment, the charger 20 further includes a rectifying and filtering circuit 21, and a charge circuit 22. The rectifying and filtering circuit 21 is coupled to the secondary winding ($W_s$) for rectifying and filtering the output voltage ($V_s$) across the secondary winding ($W_s$) to generate a DC voltage. The charge circuit 22 is coupled to the rectifying and filtering circuit 21 for converting the DC voltage from the rectifying and filtering circuit to the charging voltage, and then supplies the charging voltage to the rechargeable battery 42 of the touch pen 40.

In such a configuration, the touch pen 40 is easily charged by the non-contact battery charging device of this invention upon being inserted into the pen stand 11, thereby resulting in convenience during use. Furthermore, the non-contact battery charging device of this invention utilizes electromagnetic induction without exposed electrical contacts, thereby avoiding poor electrical conductivity caused by oxidation of the electrical contacts.

Figure 5:
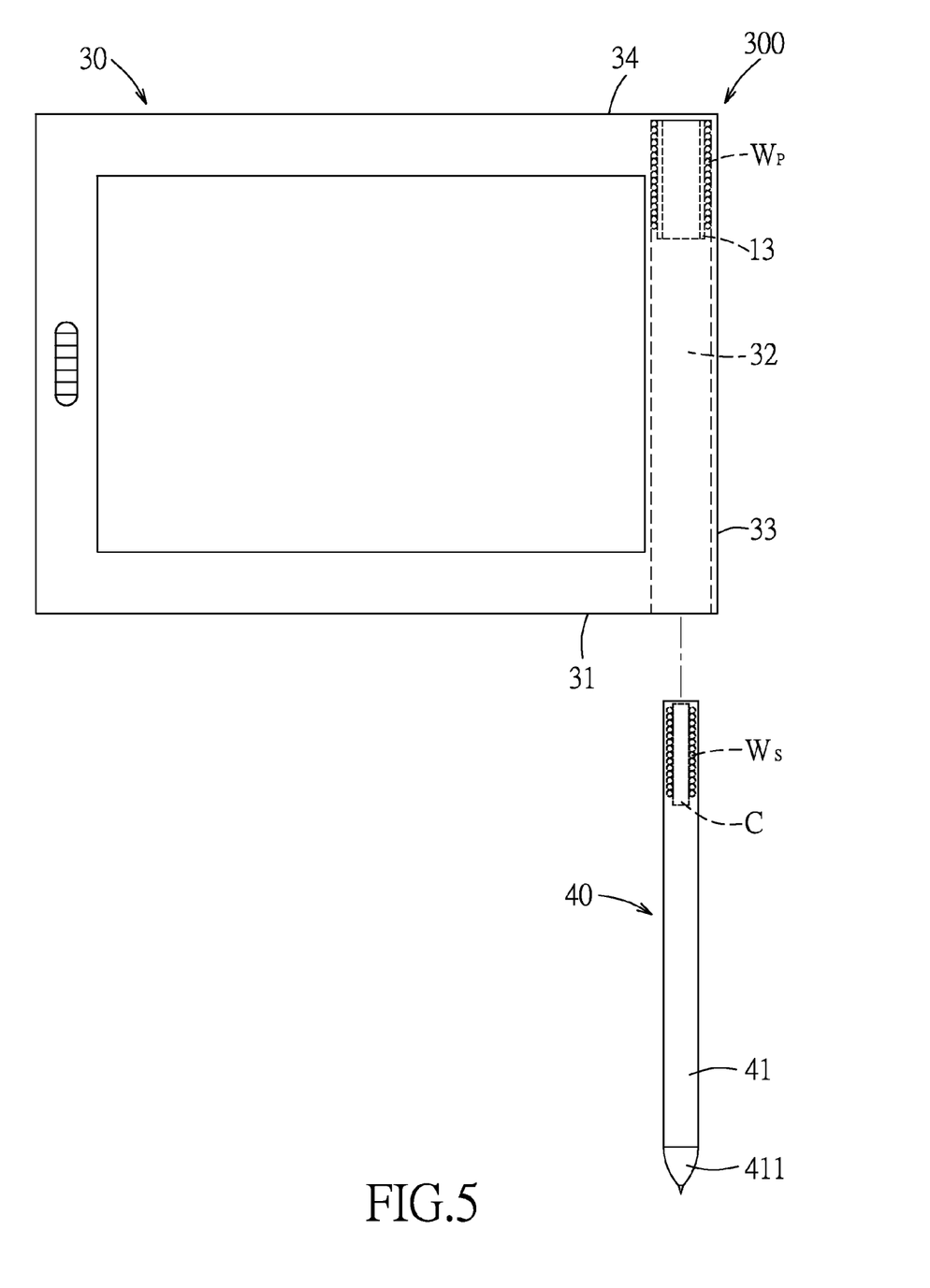
FIG. 5 is a schematic view showing a second preferred embodiment of a non-contact battery charging device for charging a touch pen according to the present invention.

FIG. 5 illustrates the second preferred embodiment of a non-contact battery charging device for charging a touch pen 40 according to this invention, which is a modification of the first preferred embodiment. In this embodiment, the charging stand is provided in a portable computerized device (e.g., a flat panel computer 300) for use with the touch pen 40. The flat panel computer 300 has a computer housing 30 that serves as the pen stand of the charging stand. The computer housing 30 has a bottom side 31 formed with an upwardly extending receiving slot 32 that is disposed adjacent to a lateral side 33 and that serves as the receptacle of the pen stand for receiving the whole touch pen 40. In this embodiment, the assembly of the primary winding ($W_p$) and the insulating spool 13 is secured in the receiving slot 32 and is disposed adjacent to a topside 34 of the computer housing 30. As such, when the touch pen 40 is inserted into the receiving slot 32 so as to be moved to a charging position, the assembly of the magnetic core (C) and the secondary winding ($W_s$) is located in the insulating spool 13, and the writing end 411 of the pen barrel 41 of the touch pen 40 is adjacent to the bottom side 31 of the computer housing 30. In this case, the touch pen 40 can be charged.

Figure 6:
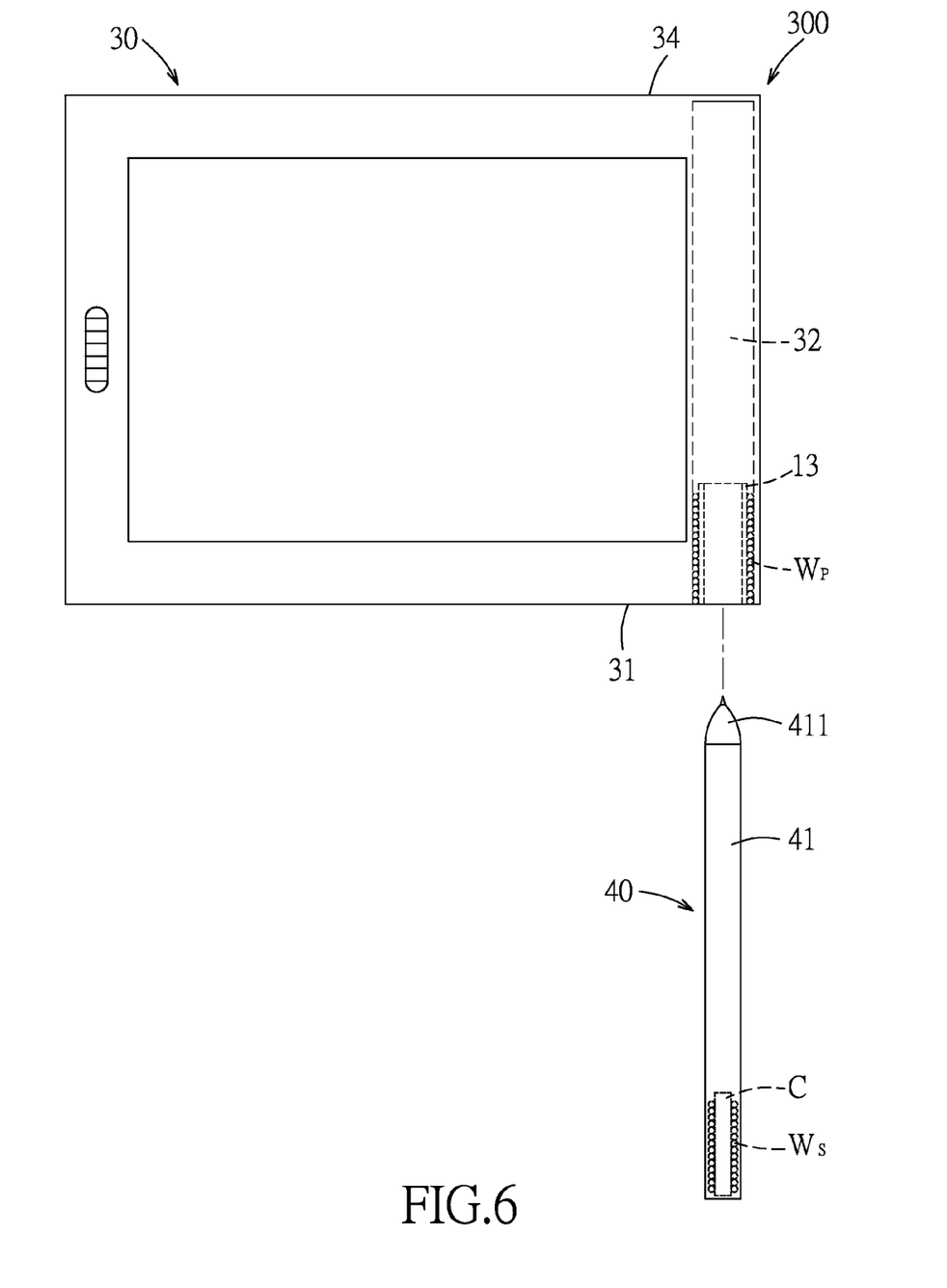
FIG. 6 is a schematic view showing a variation of the second preferred embodiment.

FIG. 6 illustrates a variation of the second preferred embodiment. The non-contact battery charging device of FIG. 6 differs from the non-contact battery charging device of FIG. 5 in that the assembly of the primary winding ($W_p$) and the insulating spool 13 is disposed adjacent to the bottom side 31 of the computer housing 30. As a result, when the touch pen 40 is inserted into the receiving slot 32 so as to be moved to the charging position, the writing end 411 of the pen barrel 40 of the touch pen 40 is adjacent to the top side 34 of the computer housing 30.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A combined transformer for use in a battery charging device for charging a touch pen, said combined transformer comprising:
    a tubular insulating spool allowing extension of the touch pen therethrough;
    a primary winding wound directly onto said tubular insulating spool;
    an elongate magnetic core used to be coaxially secured in the touch pen, a section of said magnetic core being coaxially located in said tubular insulating spool when the touch pen extends through said tubular insulating spool to be charged such that said primary winding coaxially surrounds said section of said magnetic core; and
    a secondary winding used to be disposed in the touch pen and wound directly onto said magnetic core, said secondary winding being coaxial with said primary winding when the touch pen extends through said tubular insulating spool such that said primary winding cooperates with said primary winding and said magnetic core to serve as a transformer.

2. The combined transformer as claimed in claim 1, wherein said secondary winding is disposed around said section of said magnetic core.

3. The combined transformer as claimed in claim 1, wherein said tubular insulating spool is made of plastic.

4. A non-contact battery charging device for charging a touch pen, comprising:
    a pen stand having a receptacle for receiving the touch pen, said receptacle having an opening allowing insertion of the touch pen into said receptacle therethrough;
    a combined transformer including
        a tubular insulating spool secured in said receptacle of said pen stand and allowing extension of the touch pen therethrough,
        a primary winding wound directly onto said tubular insulating spool,
        an elongate magnetic core used to be coaxially secured in the touch pen, a section of said magnetic core being coaxially located in said tubular insulating spool when the touch pen is inserted into said receptacle of said pen stand through said opening and extends through said tubular insulating spool to be charged such that said primary winding coaxially surrounds said section of said magnetic core, and
        a secondary winding used to be disposed in the touch pen and wound directly onto said magnetic core, said secondary winding being coaxial with said primary winding when the touch pen extends through said tubular insulating spool such that said primary winding cooperates with said primary winding and said magnetic core to serve as a transformer;
    a frequency signal generator disposed in said pen stand for generating a high frequency voltage signal and applying the high frequency voltage signal to said primary winding of said combined transformer; and
    a charger used to be disposed in the touch pen and having an assembly of said magnetic core and said secondary winding of said combined transformer, said charger being operable to supply a charging voltage to a rechargeable battery in the touch pen based on an input voltage across said primary winding of said combined transformer;
    wherein, when the touch pen is inserted into said receptacle of said pen stand to be charged, said charger converts an output voltage, which is induced across said secondary winding of said combined trans former by making use of electromagnetic induction under high frequency oscillation, to the charging voltage.

5. The non-contact battery charging device as claimed in claim 4, wherein said tubular insulating spool is made of plastic.

6. The non-contact battery charging device as claimed in claim 4, wherein the high frequency voltage signal is one of a sine wave signal and a square wave signal.

7. The non-contact battery charging device as claimed in claim 4, wherein said secondary winding is disposed around said section of said magnetic core.

8. The non-contact battery charging device as claimed in claim 4, wherein said charger includes:
    a rectifying and filtering circuit coupled to said secondary winding of said combined transformer for rectifying and filtering the output voltage across said secondary winding to generate a DC voltage; and
    a charge circuit coupled to said rectifying and filtering circuit for converting the DC voltage from said rectifying and filtering circuit to the charging voltage and supplying the charging voltage to the rechargeable battery of the touch pen.

9. The non-contact battery charging device as claimed in claim 4, wherein said pen stand cooperates with an assembly of said tubular insulating spool and said primary winding of said combined transformer, and said frequency signal generator to constitute a charging stand.

10. The non-contact battery charging device as claimed in claim 9, wherein said charging stand is provided in a portable computerized device for use with the touch pen.

11. The non-contact battery charging device as claimed in claim 10, wherein said portable computerized device is a flat panel computer.

\* \* \* \* \*